March 8, 1949.　　　P. W. WYCKOFF　　　2,463,931
APPARATUS FOR SUCCESSIVELY MAKING
APPROXIMATE AND FINAL ADJUSTMENTS
Original Filed March 27, 1943
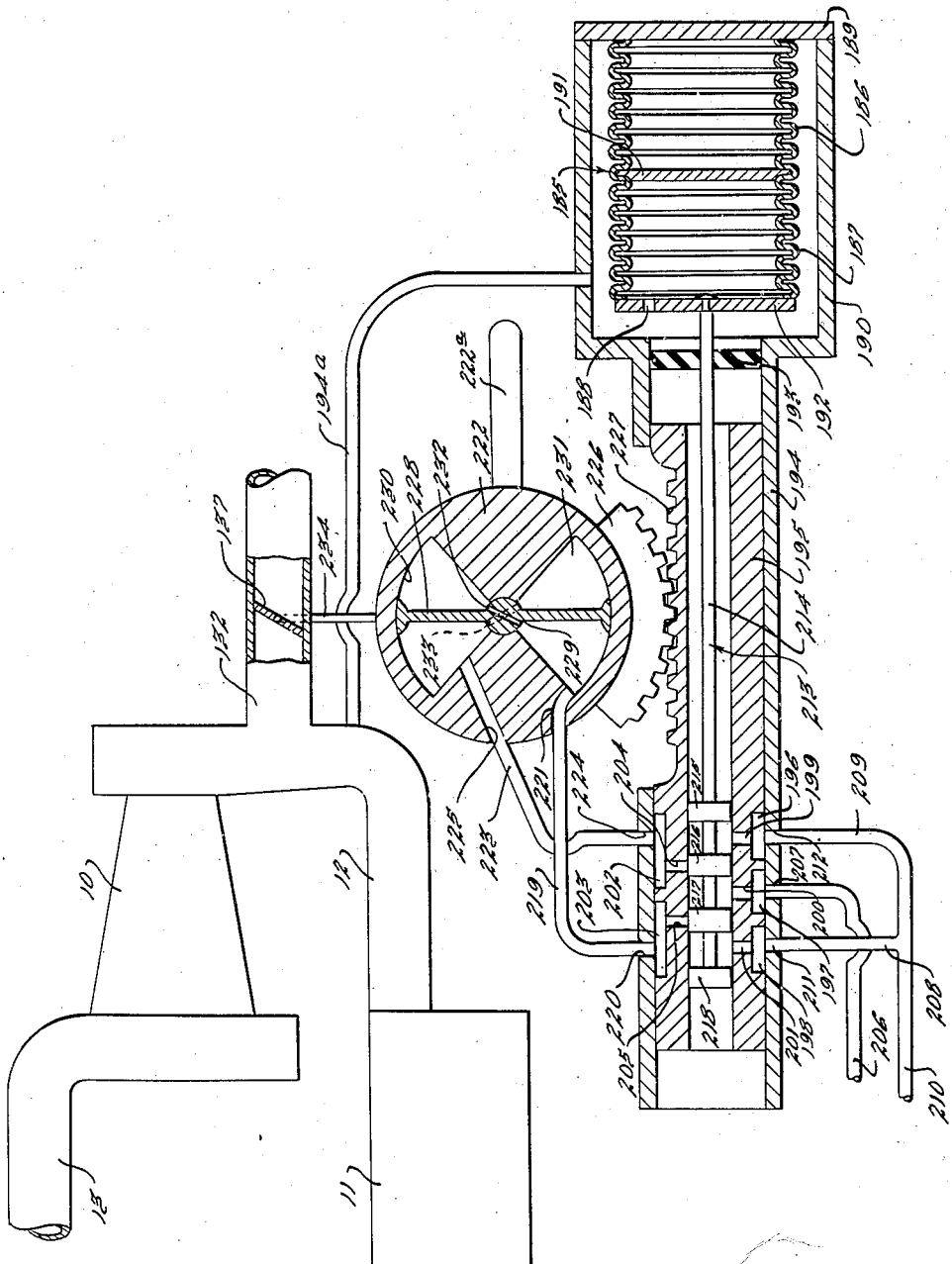
INVENTOR.
Paul W. Wyckoff
BY
Harness and Harris
ATTORNEYS.

Patented Mar. 8, 1949

2,463,931

UNITED STATES PATENT OFFICE 2,463,931

APPARATUS FOR SUCCESSIVELY MAKING APPROXIMATE AND FINAL ADJUSTMENTS

Paul W. Wyckoff, Detroit, Mich., assignor to Chrysler Corporation, Highland Park, Mich., a corporation of Delaware Original application March 27, 1943, Serial No. 480,786, now Patent No. 2,402,885, dated June 25, 1946. Divided and this application January 3, 1944, Serial No. 516,859

13 Claims. (Cl. 121—38)

This application is a division of Gilfillan et al. application Serial No. 480,786, filed March 27, 1943, issued as Patent No. 2,402,885, dated June 25, 1946. The invention claimed in the present application relates to a control apparatus and more specifically to an apparatus by which a control device determining a certain desired condition is brought to an approximate position determining such condition and is then accurately adjusted to final position for such condition. In a more limited way, the desired condition is a certain pressure of gas.

It is known to obtain a certain condition, such as a predetermined gas pressure, by means of an apparatus involving a manually settable part positionable for an indication of the predetermined gas pressure and a control device accurately positionable to obtain the predetermined gas pressure in accordance with the position of the manually settable part. In some instances, the setting of the part to its position brings an immediate approximate positioning of the control device, which is followed by an accurate positioning carried out automatically. The advantage in this arrangement is that the certain condition such as gas pressure is obtained more quickly. The apparatus constituting the invention of the present application relates to an improvement of an arrangement of this sort.

An object of the present invention is to provide an improvement in a control apparatus that obtains a certain condition by causing the movement of a manually settable part to a position representing the certain condition to effect a movement of a control device to an approximate position for the certain condition and automatically adjusting the control device to an exact position for the certain condition.

Another object is an improvement in apparatus of the above type that employs a lock for causing the manually settable part to move the control device to an approximate position for the desired condition.

Still another object is an improvement of an apparatus of the above type, the lock of which is a fluid lock.

A further object is to provide improvements in an apparatus of the type stated in the preceding paragraph in which fluid means is employed to bring the control device to approximate and exact positions representing the desired certain condition.

Other objects will appear from the disclosure.

In the drawing, the figure shows a control apparatus embodying the principles of the invention.

A supercharger 10 of the axial type is connected to an engine 11 by means of a conduit 12, which passes air delivered by the supercharger to the engine. The supercharger 10 receives air through a pipe 13. A pipe 132, connected to the pipe 12, carries a spill valve 137.

A bellows construction 185 comprises a bellows 186 containing a vacuum and a bellows 187 having a restricted opening 188. The bellows 186 is secured to an end member 189 of a housing 190. The bellows 186 and 187 are directly attached to one another through a common end wall 191. The bellows 187 has an end wall 192 in which is located the restricted opening 188 previously referred to. A sealing member 193 seals the housing 190 from a tubular extension thereof 194. A line 194a communicates pressure of the delivery line 12 of the supercharger 10 to the housing 190. Slidably mounted on the tubular extension 194 is an outer valve part 195 having at one side three grooves 196, 197, and 198 and three ports 199, 200, and 201 communicating with the previously mentioned grooves respectively. At the other side of the outer valve part 195 are extended grooves 202 and 203 communicating with ports 204 and 205. A pressure line 206 is connected at an opening 207 in the tubular extension 194 directly opposite the groove 197. Lines 208 and 209 merging into a common drain line 210 are connected respectively to the tubular extension 194 at openings 211 and 212 directly opposite grooves 196 and 198 respectively in the outer valve part 195. Slidably mounted within outer valve part 195 is an inner valve part 213 having a stem 214 securably attached to the end wall 192 of the bellows 187 and spaced valve sections 215, 216, 217, and 218. A line 219 extends from an opening 220 in the tubular extension 194 directly opposite the groove 203 to a passage 221 in a rotatable housing 222. A line 223 extends from an opening 224 in the tubular extension 194 directly opposite the groove 202 to a passage 225 in the rotary housing 222, carrying means 222a, by which the housing may be angularly moved or adjusted. The housing 222 has attached thereto a gear segment 226 in mesh with a rack 227 formed on the outer valve part 195. Positioned within the housing 222 is a vane 228 having a hub 229. The vane 228 is capable of angular movement with respect to the housing 222 about the hub 229. The vane moves in chambers 230 and 231 formed in the rotary housing 222. A passage 232 provides communication between the portion of the chamber 231 to the left of the vane 228 and the portion of the chamber 230 to the right of the vane 228. A passage 233 in the hub provides communication between the portion of the chamber 231 to the right of the vane 228 and the portion of the chamber 230 to the left of the vane.

Since the housing 190 is subjected through the line 194a to the delivery pressure of the supercharger 10, that is the pressure of the gas in the line 12 and therefore the degree of expansion or collapse of the bellows 185 is dependent upon this pressure. As the pressure increases, the bellows 186 tends to collapse. As the pressure decreases, the bellows 186 tends to expand. The restricting opening 188 in the bellows 187 causes the pressure upon the bellows to be the same both inside and outside and, therefore, the final position of the bellows construction 185 will always be dependent upon the collapse or expansion of the bellows 186. However, with sudden changes in pressure in the line 12 and corresponding sudden changes in the housing 190, the restricted opening 188 in the bellows 187 temporarily delays these changes in pressure to the interior of the bellows 187. Thus, for example, if there is a sudden rise in pressure, the pressure within the bellows 187 is for a short time somewhat less than that outside the bellows 187. Consequently, not only the bellows 186 but also the bellows 187 collapses. Thus there is a greater total collapse of the bellows construction 185. However, after a short time the pressures inside and outside the bellows 187 become equalized and the bellows expand somewhat. This final expansion of the bellows 187 has a slight subtracting effect upon the total amount of contraction of the bellows 186 resultant from the increase in pressure. With the arrangement just described the bellows construction 185 reaches a more collapsed state with a sudden increase of pressure more rapidly. Conversely if the pressure in the line 12 and the housing 190 decreases suddenly, the pressure within the bellows 187 is momentarily greater than that outside of the bellows. Thus there is an expansion of the bellows 187. This is added to the normal expansion of the bellows 186 and brings a greater expansion for the bellows construction 185. When, after a few moments, the lower pressure or the decrease in pressure is communicated to the interior of the bellows 187 it collapses slightly and so has a subtracting effect upon the expansion of the bellows 186. The result is, for a sudden decrease in pressure, a faster expansion of the bellows construction 185.

Angular position of the rotary housing 222 determines through the setting of the spill gate 137 in the outlet 132, a predetermined value of pressure in the line 12. When the actual pressure in the line 12 is equal to the predetermined pressure as determined by the angular position of the housing 222, the resultant position of the bellows construction 185 causes the valve sections 216 and 217 to cover the ports 204 and 205 and thereby to maintain a fluid lock of the vane 228 in the rotary housing 222. The angular position of the vane 228 determines the angular position of the spill gate 137 and consequently, the amount of its opening because the vane and spill gate are connected to one another through a means represented diagrammatically and designated by the reference character 234. If the pressure in the line 12 becomes greater or less than the predetermined pressure as set by angular position of the rotary housing 222, the resultant collapse or expansion of the bellows construction 185 shifts the inner valve part 213 to the right or to the left causing the parts 204 and 205 to become uncovered. If the valve part 213 shifts to the right with an increase of pressure resulting in collapse of the bellows construction 185, the line 223 is placed in communication with the pressure line 206, and the line 219, in communication with the drain line 210. The result is a clockwise movement of the vane 228 and a similar clockwise movement of the spill gate 137 to a more open position. As a result, pressure in the line 12 decreases and the bellows construction 185 expands until the valve sections 216 and 217 again cover the ports 204 and 205, re-establishing a fluid lock of the vane 228 in the housing 222 and halting the opening of the spill gate 137. If the pressure in the line 12 decreases below the predetermined pressure, the inner valve part 213 moves to the left upon the resultant expansion of the bellows construction 185, and the line 219 is placed in communication with the pressure line 206, and the line 223, in communication with the drain line 210. As a result, the vane 228 is moved counterclockwise effecting a similar counterclockwise movement of the spill gate 137 to a more closed position. An increase in the pressure in the line 12 results, and the bellows construction 185 collapses sufficiently to move the valve sections 216 and 217 back to covering relation with the ports 204 and 205, and thereby fluid lock of the vane 228 in the rotary housing 222 is re-established.

When a higher pressure or a lower pressure is desired in the line 12, the rotary housing 222 is moved counterclockwise or clockwise to the appropriate position. The fluid lock of the vane 228 maintained for the moment, causes a corresponding counterclockwise movement or clockwise movement of the vane 228 and of the spill gate 137. Thus the spill gate 137 is brought to an approximate position for the new predetermined pressure. The counterclockwise movement or the clockwise movement of the rotary housing 222 acts through the gear segment 226 and the rack 227 to move the outer valve part 195 to the right or to the left. As a result the valve sections 216 and 217 no longer cover the ports 204 and 205. Depending upon the direction of movement of the outer valve part 195 either the line 223 or the line 219 is placed in communication with the pressure line 206 resulting in either clockwise movement of the vane 228 and of the spill gate 137 to a more open position or a counterclockwise movement of the vane and of the spill gate to a more closed position. The resultant change in pressure through change in the position of the spill gate 137 produces the corresponding expansion or collapse of the bellows construction 185, and the valve sections 216 and 217 again cover the ports 204 and 205, thereby re-establishing the fluid lock of the vane 228 in the rotary housing 222 and a holding of the spill gate 137.

The intention is to limit the invention only within the scope of the appended claims.

I claim:

1. In combination, a first member, a second member, means forming a fluid lock between the members, means for shifting the first member to a new position and for thereby with the aid of the fluid lock shifting the second member to an approximate new position, means for causing shifting of the first member to break the fluid lock between the members and to apply fluid pressure to adjust the second member to a new final position, and means for causing the assumption by the second member of the new final position to restore the fluid lock between the members.

2. In combination, an angularly shiftable housing, a vane rotatably mounted within the housing, a pair of conduits for fluid leading to opposite sides of the vane, a pair of cooperating valve parts blocking escape of fluid from said conduits for providing a fluid lock of the vane in the housing and thereby causing movement of the housing to a new position to bring the vane to an approximate new position, means connecting one valve part with the housing for causing the said movement of the housing to shift the said one valve part with respect to the other valve part to admit fluid under pressure to the conduit leading to one side of the vane and to open the other conduit to drain for moving the vane to a final new position and means responsive to assumption by the vane of the final new position for positioning the said other valve part with respect to the said one valve part to block the escape of fluid from both conduits.

3. In combination, a first member, a second member adjustable with respect to the first member, fluid means for controlling the adjustment of the second member with respect to the first member, valve parts relatively positionable for causing the fluid means to adjust the second member with respect to the first member in one direction and in the opposite direction and to provide a fluid lock of the second member with respect to the first member, means for shifting the first member to a new position and causing the fluid lock to shift the second member to a new approximate position, means connecting one valve part to the first member for causing the aforesaid shifting of the first member to produce a relative positioning of the valve parts breaking the fluid lock for adjusting the second member to a new accurate position, and means responsive to assumption by the second member of the new accurate position for positioning another of the valve parts to restore the fluid lock of the second member with respect to the first member.

4. In combination, a manually rotatable housing, a vane rotatably mounted in the housing, means for supplying fluid under pressure to both sides of the vane, a valve sleeve carrying rack teeth, a valve rod mounted within the sleeve, the valve sleeve and valve rod being relatively positionable to admit fluid under pressure to one side or the other of the vane to move it in one direction or the other with respect to the housing or to lock fluid within the housing on both sides of the vane to prevent relative movement of the vane and the housing, a bellows responsive to pressure, means connecting the bellows and the valve rod to cause the bellows to control the position of the valve rod, and a gear segment secured to the rotatable housing and meshing with the rack teeth on the sleeve to cause rotation of the housing to shift the sleeve, whereby rotation of the housing to a new position acts by means of the fluid lock of the vane in the housing to bring the vane to a new approximate position and breaks the fluid lock by acting through the gear segment and rack teeth to shift the valve sleeve to permit the supplying of fluid under pressure to one side of the vane to adjust the vane with respect to the housing to a new accurate position, and the assumption by the vane of the new accurate position acts through the bellows to position the valve rod with respect to the valve sleeve to restore a fluid lock of the vane in the housing.

5. In combination, a casing, a member mounted within the casing, a pair of conduits for fluid leading to opposite sides of the member, means for moving the casing to a new position a pair of cooperating valve parts blocking escape of fluid from said conduits for providing a fluid lock of the member in the casing and thereby causing movement of the casing to its new position to bring the member to an approximate new position, means connecting one valve part with the casing for causing the said movement of the casing to shift the said one valve part with respect to the other valve part and thereby to admit fluid under pressure to the conduit leading to one side of the member and to open the other conduit to drain for moving the member to an accurate new position, and means responsive to assumption by the member of the accurate new position for positioning the said other valve part with respect to the said one valve part to block the escape of fluid from both conduits.

6. In combination, a first member, a second member adjustable with respect to the first member, fluid means for controlling the adjustment of the second member with respect to the first member, valve parts relatively positionable for causing the fluid means to adjust the second member with respect to the first member in one direction and in the opposite direction and to provide a fluid lock of the second member with respect to the first member, means for shifting the first member to a new position and causing the fluid lock due to the relative position of the valve parts to move the second member to an approximate new position, means connecting one valve part to the first member for causing the aforesaid shifting of the first member to produce a relative positioning of the valve parts breaking the fluid lock for adjusting the second member to an accurate new position, and means responsive to assumption by the second member of its accurate new position for positioning another valve part to produce the fluid lock of the second member with respect to the first member.

7. In combination, a first member, a second member adjustable with respect to the first member, fluid means for controlling the adjustment of the second member with respect to the first member, valve means for causing the fluid means to adjust the second member with respect to the first member in one direction or the other and to hold the second member against adjustment with respect to the first member by a fluid lock, means for shifting the first member to a new position and for causing the fluid lock to adjust the second member and the device to an approximate new position, means connecting the valve means with the first member for causing shifting of the first member to its new position to break the fluid lock and to move the second member to an accurate new position, and means responsive to assumption by the second member of its accurate new position to cause the valve means again to provide a fluid lock of the second member with respect to the first member.

8. In combination, a first member, a second member adjustable with respect to the first member, fluid means for adjusting the first member with respect to the second member, means forming a fluid lock between the members for preventing relative adjustment between the members, means for shifting the first member to a new position and therewith shifting the means forming the fluid lock to bring the second member to an approximate new position, means responsive to shifting of the first member to break the fluid lock and to adjust the second member with respect to the first member to an accurate new position, and means responsive to assumption by the second member of its accurate new position to restore the fluid lock between the members.

9. In combination, a first member, a second member adjustable with respect to the first member, means for adjusting the second member with respect to the first member, means forming a lock between the members for preventing relative adjustment of the members, means for shifting the first member to a new position, the lock between the members causing therewith a shifting of the second member and the control device to an approximate new position, means responsive to shifting of the first member to break the lock and to cause the adjusting means to adjust the second member with respect to the first member to an accurate new position, and means responsive to assumption by the second member of its accurate new position to restore the lock between the members.

10. Apparatus for adjusting the value of a condition, comprising a first member shiftable to various positions representing various values of the condition, a second member shiftable to produce various values of the above condition, fluid means for adjusting the second member with respect to the first member, valve means for causing the fluid means to adjust the second member with respect to the first member in one direction or the other and to hold the second member against adjustment with respect to the first member by a fluid lock, means for shifting the first member to a position representing a desired value of the condition and for causing the fluid lock to shift the second member to a position for approximately producing the said desired value of the condition, means connecting the valve means with the first member for causing shifting of the first member to its aforesaid position to break the fluid lock and to adjust the second member for accurately producing the said desired value of the condition, and means responsive to arrival of the condition at the said desired value to cause the valve means again to provide a fluid lock of the second member with respect to the first member.

11. Apparatus for adjusting the value of a condition, comprising a rotatable housing member, a vane member rotatably mounted in the housing member, one member being manually rotatable to various positions representing various values of the condition, the other member being rotatable to produce various values of the condition, means for supplying fluid under pressure between the members, a pair of cooperating valve parts relatively positionable to admit pressure fluid in one way or the other between the members to produce rotation of the said other member with respect to the said one member in one direction or the other or to lock fluid within the housing member on both sides of the vane member to prevent relative rotation between the members, means responsive to various values of the condition, means connecting the condition-responsive means and one valve part to cause the condition-responsive means to control the position of the said one valve part, means connecting the other valve part to the said one member, whereby rotation of the said one member to a position representing a desired value of the condition acts by means of the fluid lock between the members to position the said other member for approximately producing the said desired value of the condition and breaks the fluid lock by acting through the connection between the said one member and the said other valve part to provide for the supplying of pressure fluid in the appropriate way between the members to rotate the said other member with respect to the said one member for accurately producing the said desired value of the condition, and the arrival of the desired value of the condition acts through the condition-responsive means to position the said one valve part with respect to the said other valve part to restore a fluid lock beween the vane and housing members.

12. Apparatus for adjusting the value of a condition, comprising a housing manually rotatable to various positions representing various values of the condition, a vane rotatably mounted in the housing to produce various values of the condition, means for supplying fluid under pressure to both sides of the vane, a pair of cooperating valve parts relatively positonable to admit fluid under pressure to one side or the other of the vane to move it in one direction or the other with respect to the housing or to lock fluid within the housing on both sides of the vane to prevent relative movement of the vane and the housing, means responsive to the various values of the said conditions, means connecting the condition-responsive means and one valve part to cause the condition-responsive means to control the position of the said one valve part, rack teeth associated with the other valve part, arcuate teeth connected to the housing and meshing with the rack teeth to cause rotation of the housing to shift the said other valve part, whereby rotation of the housing to a position representing a predetermined value of pressure acts by means of the fluid lock of the vane in the housing to position the vane for approximately establishing the said predetermined value of the condition and breaks the fluid lock by acting through the arcuate teeth and rack teeth to shift the said other valve part to permit the supplying of fluid under pressure to one side of the vane to adjust the vane with respect to the housing and thereby for accurately producing the said predetermined value of the condition, and the arrival of the predetermined value of the condition acts through the condition-responsive means to position the said one valve part with respect to the said other valve part to restore the fluid lock of the vane in the housing.

13. Apparatus for adjusting gas pressure comprising a housing manually rotatable to various positions representing various values of gas pressure, a vane rotatably mounted in the housing to produce various values of gas pressure, means for supplying fluid under pressure to both sides of the vane, a valve sleeve, a valve rod mounted within the sleeve, the valve sleeve and valve rod being relatively positionable to admit fluid under pressure to one side or the other of the vane to move it in one direction or the other with respect to the housing or to lock fluid within the housing on both sides of the vane to prevent relative movement of the vane and the housing, a bellows responsive to gas pressure, means connecting the bellows and the valve rod to cause the bellows to control the position of the valve rod, the valve sleeve carrying rack teeth, and a gear segment secured to the rotatable housing and meshing with the rack teeth on the sleeve to cause rotation of the housing to shift the sleeve, whereby rotation of the housing to a position representing a predetermined value of gas pressure acts by means of the fluid lock of the vane in the housing to position the vane for approximately establishing the said predetermined value of gas pressure and breaks the fluid lock by acting through the gear segment and rack teeth to shift the valve sleeve to permit the supplying of fluid under pressure to one side of the vane to shift the vane with respect to the housing and thereby to adjust the vane for accurately establishing desired value of pressure, and the arrival of the pressure at the desired value acts through the bellows to position the valve rod with respect to the valve sleeve to cause a fluid lock of the vane in the housing.

PAUL W. WYCKOFF.

REFERENCES CITED

The following references are of record in the file of this patent:

UNITED STATES PATENTS

| Number | Name | Date |
|---|---|---|
| 1,346,124 | Guerrlich | July 13, 1920 |
| 1,916,433 | Muller | July 4, 1933 |
| 1,984,013 | Fost | Dec. 11, 1934 |
| 2,239,305 | Tacconi | Apr. 22, 1941 |
| 2,311,936 | Elfes | Feb. 23, 1943 |
| 2,402,885 | Gilfillan et al. | June 25, 1946 |

FOREIGN PATENTS

| Number | Country | Date |
|---|---|---|
| 466,203 | Great Britain | May 18, 1937 |
| 852,019 | France | Oct. 16, 1939 |